United States Patent [19]

Goebel

[11] Patent Number: 4,539,272
[45] Date of Patent: Sep. 3, 1985

[54] ELECTROCHEMICAL CELL HAVING A PLURALITY OF BATTERY STACKS

[75] Inventor: Franz Goebel, Sudbury, Mass.

[73] Assignee: GTE Government Systems Corporation, Stamford, Conn.

[21] Appl. No.: 559,059

[22] Filed: Dec. 7, 1983

[51] Int. Cl.³ ............................................. H01M 6/10
[52] U.S. Cl. ...................................... 429/94; 429/101; 429/194; 429/211
[58] Field of Search ................. 429/94, 156, 157, 158, 429/159, 161, 194, 196, 101, 149

[56] References Cited

U.S. PATENT DOCUMENTS

| | | | |
|---|---|---|---|
| 3,373,060 | 3/1968 | Gray | 429/94 |
| 3,490,949 | 1/1970 | Deschamps | 429/94 |
| 3,510,353 | 5/1978 | McHenry | 429/94 |
| 3,565,690 | 2/1971 | Jochaud du Plessix et al. | 429/94 |
| 3,761,314 | 9/1973 | Cailley | 429/94 |
| 3,775,182 | 11/1973 | Patton et al. | 429/94 |
| 4,020,248 | 4/1977 | Goebel | 429/164 |
| 4,450,213 | 5/1984 | Dey et al. | 429/194 |

FOREIGN PATENT DOCUMENTS 1086393 8/1908 Canada .
1026441 5/1978 Canada .

Primary Examiner—Anthony Skapars
Attorney, Agent, or Firm—David M. Keay

[57] ABSTRACT

Electrochemical cell having at least two battery stacks each including an electrode assembly wound on a spool. Each electrode assembly includes two elongated electrode structures, an anode electrode structure and a cathode current collector structure. The electrode structures are wound around the center post of the spool with the anode electrode structure making contact with one of the conductive flanges of the spool and the cathode current collector structure making electrical contact with the other conductive flange of the spool. The flanges in contact with the anode structures of the battery stacks are connected to one external terminal of the cell, and the flanges in contact with the cathode current collector structures of the battery stacks are connected to another external terminal of the cell.

12 Claims, 3 Drawing Figures

ELECTROCHEMICAL CELL HAVING A PLURALITY OF BATTERY STACKS

CROSS-REFEREMCE TO RELATED APPLICATIONS

Application Ser. No. 559,061 filed concurrently herewith by Franz Goebel entitled "Electrochemical Cell" and application Ser. No. 559,060 filed concurrently herewith by Franz Goebel entitled "Electrode Structure for Electrochemical Cell" describe and claim subject matter related to the present application.

BACKGROUND OF THE INVENTION

This invention relates to electrochemical cells. More particularly, it is concerned with electrochemical cells having wound electrode structures.

A particularly effective class of primary electrochemical cells which employs soluble or liquid cathode materials, as opposed to more conventional solid cathodes, has undergone rapid development in recent years. In these cells the active cathode material is usually a fluid solvent for an electrolyte solute which provides conductivity. The active anode of the cell is usually lithium or other highly electropositive metal. During discharge the solvent is electrochemically reduced on a cathode current collector.

In electrochemical cells of the foregoing type of cylindrical configuration one form of electrode structure which has become widely used is the so-called "jelly-roll" type of electrode assembly which is described in U.S. Pat. Nos. 3,510,353 to McHenry and 4,020,248 to Goebel. With this type of electrode construction the anode electrode and the cathode current collector electrode are elongated structures which are wound in a coil to provide alternating anode and cathode current collector electrodes separated by intervening insulating material. The cylindrical battery stack thus formed is placed in a cylindrical case of a housing with appropriate electrical connections provided between the electrodes and external terminals.

Cells with the foregoing "jelly-roll" battery stack arrangement may exhibit certain problems, particularly when operated under high discharge conditions. The paths of current flow from different portions of each of the electrodes to the external terminals vary; and, therefore, internal temperatures and internal resistances are not uniform throughout the battery stack. With electrodes of large area for operation under high discharge conditions current paths from some portions of the electrodes are relatively long causing excessive internal resistance losses. There are also difficulties in winding the assembly of electrodes and in assembling the battery stack with the cylindrical case of the cell housing.

SUMMARY OF THE INVENTION

An improved electrochemical cell of the type having a wound electrode structure in accordance with the present invention comprises a housing and an electrochemical system within the housing including an electrolytic solution and first and second battery stacks exposed to the electrolytic solution. The first battery stack includes a spool having first and second conductive contact members with a post therebetween supporting the contact members in fixed relationship and electrically insulated from each other. A first electrode structure and a second electrode structure are wound about the post and are electrically insulated from each other. The first electrode structure is in physical and electrical contact with the first conductive contact member and is electrically insulated from the second conductive contact member. The second electrode structure is in physical and electrical contact with the second conductive contact member and is electrically insulated from first conductive contact member. The second battery stack includes a spool having first and second conductive contact members with a post therebetween supporting the contact members in fixed relationship and electrically insulated from each other. A first electrode structure and a second electrode structure are wound about the post and are electrically insulated from each other. The first electrode structure is in physical and electrical contact with the first conductive contact member and is electrically insulated from the second conductive contact member. The second electrode structure is in physical and electrical contact with the second conductive contact member and is electrically insulated from the first conductive contact member.

For a better understanding of the present invention, together with other and further objects, advantages, and capabilities thereof, reference is made to the following discussion and appended claims in connection with the above-described drawings.

DETAILED DESCRIPTION OF THE INVENTION

Figure 1:
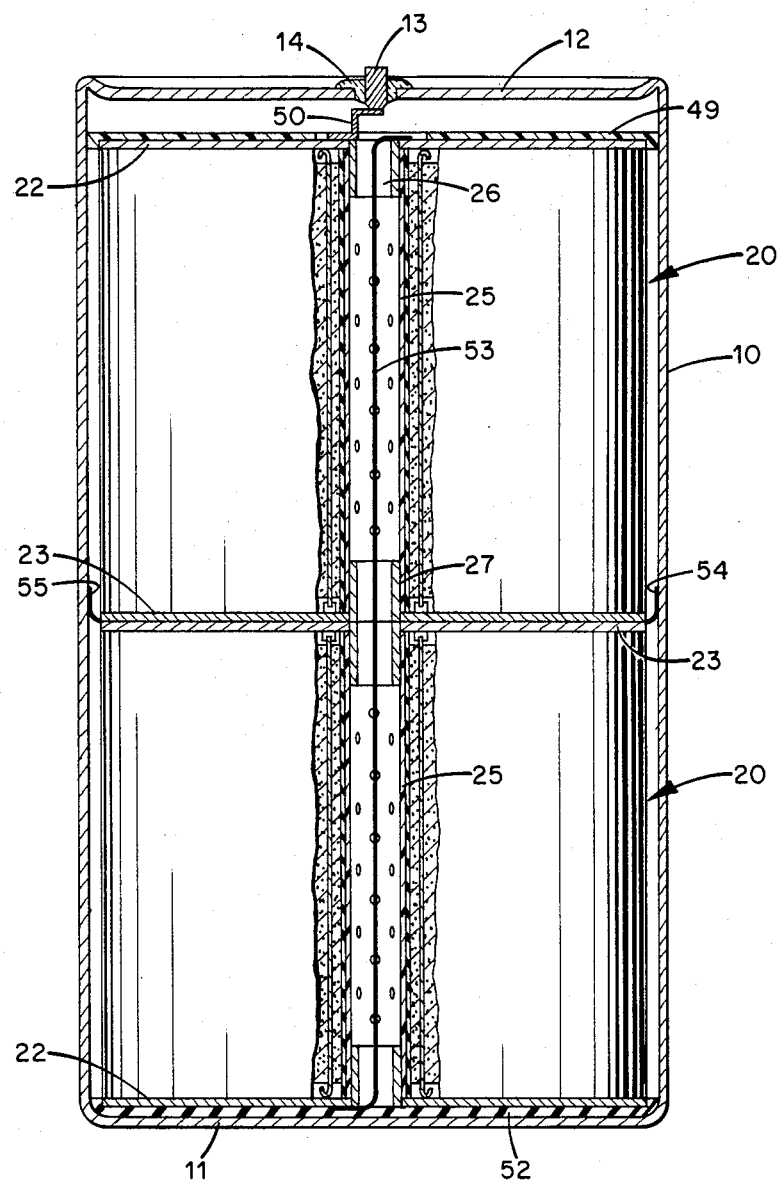
FIG. 1 is an elevational view partially in cross-section illustrating an electrochemical cell in accordance with the present invention.

FIG. 1 illustrates an electrochemical cell in accordance with the present invention. The cell includes a housing of a hollow, cylindrical, metal case 10 closed at one end with a bottom wall 11. The other end of the case 10 is closed by a metal cover 12 sealed to the case. A metal terminal 13 is sealed through a hermetic insulating seal member 14 centrally of the cover.

Figure 2:
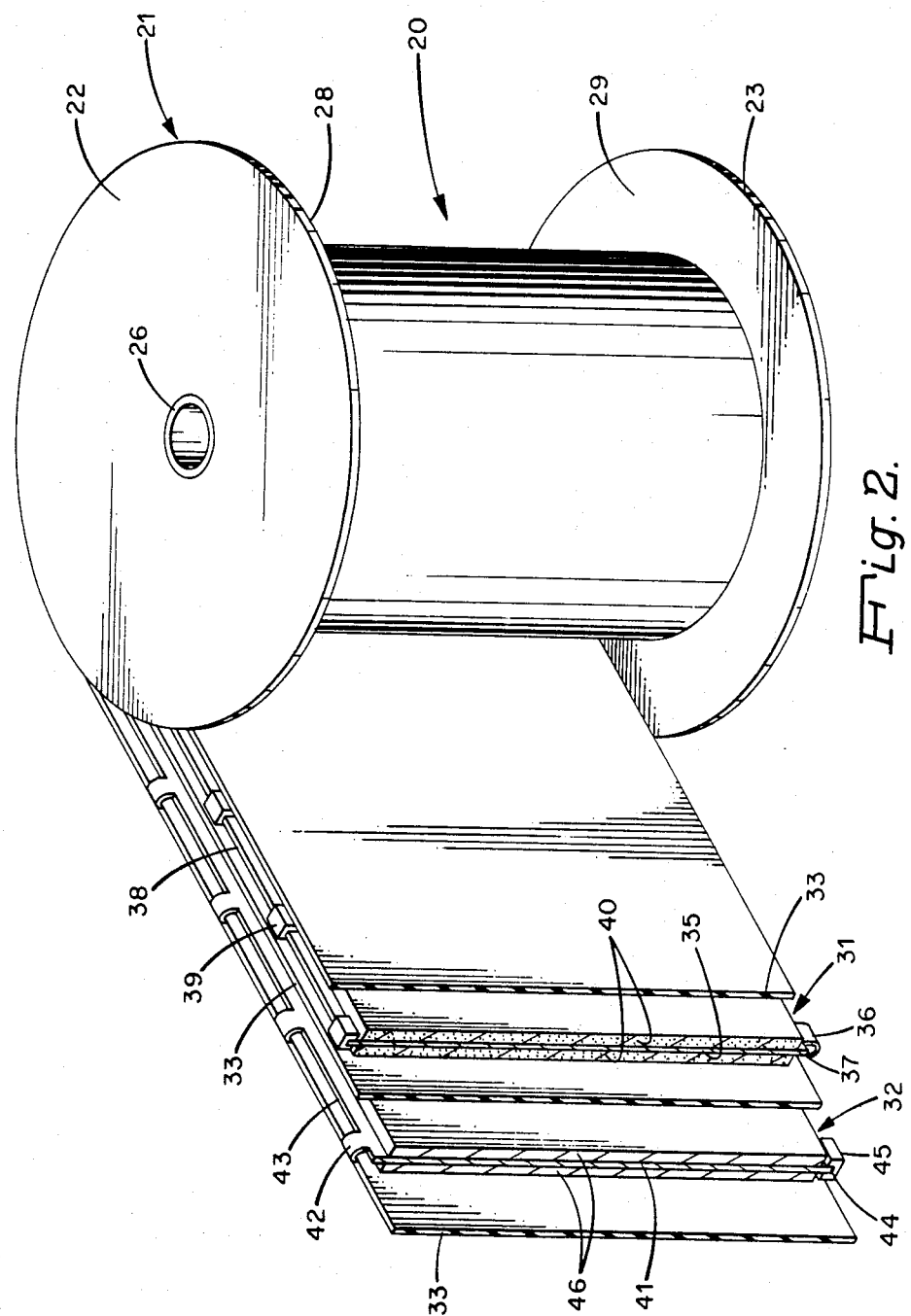
FIG. 2 is a perspective view illustrating one of the battery stacks of the electrochemical cell of FIG. 1 with portions broken away showing the electrode structures partially wound on a post.

The housing contains an electrochemical system which includes two battery stacks 20 one of which is shown in FIG. 2. Each battery stack 20 includes an assembly of electrodes wound on a spool or reel 21. The spool 21 as shown in FIG. 2 has an upper flange 22 and a lower flange 23 of metal. A central post or shaft 25 of a suitable insulating material such as a fluorocarbon material which is inert to the ingredients of the electrochemical system supports the flanges 22 and 23 in spaced apart relationship. The flanges 22 and 23 are positioned in the post 25 by hubs 26 and 27 of the flanges 22 and 23 inserted into the ends of the cylindrical post. The flanges 22 and 23 serve as contact members with their opposed inner surfaces 28 and 29 forming contact surfaces parallel to each other and normal to the post.

An electrode assembly of a first electrode structure 31, specifically a cathode current collector, structure, and a second electrode structure 32, specifically an anode electrode structure, are wound around the central post 25 with intervening insulating material 33 separating the electrode structures to maintain them physically separated and electrically insulated from each other. As can best be seen in the perspective view of FIG. 2, the cathode current collector electrode structure 31 includes a substrate 35 of thin, solid metal which is inert to the ingredients of the electrochemical system, for example, nickel. The substrate 35 is an elongated member having resilient metal elements or tabs 36 spaced along one edge 37, the lower edge as shown in FIG. 2. Preferably the tabs 36 are slightly curved for purposes to be explained hereinbelow. Insulators 39 are spaced along the opposite edge 38 of the substrate 35. On both sides of the metal substrate 35 are adherent porous layers 40 of a suitable catalytic material for reducing liquid cathode material of the electrochemical system. Various catalyst materials are known, for example porous carbon black.

The anode electrode structure 32 includes a substrate 41 similar to that of the cathode current collector substrate having contact tabs 42 along one edge 43, the upper edge as shown in FIG. 2. The other edge 44 of the substrate has spacers 45 of insulating material positioned therealong. Both sides of the metal substrate 41 are coated with an adherent layer 46 of a suitable oxidizable active anode material, for example lithium metal.

The electrode assembly is wound around the central post 25 of the spool 21 as illustrated by FIG. 2. The deflective contact elements or tabs 36 of the cathode current electrode 31 extend beyond the catalyst material and make physical and electrical contact with the upper surface 29 of the lower flange 23 of the spool which becomes the cathode current collector contact member. The upper edge 38 of the cathode current collector electrode structure 31 is insulated from contact with the upper flange 22 by the insulating spacers 39. The deflective contact tabs 42 of the substrate 41 of the anode electrode structure 32 make physical and electrical contact with the lower surface 28 of the upper flange 22 which becomes the anode contact member. The insulating spacers 45 along the lower edge 44 of the substrate 41 prevent the anode electrode structure 32 from being in contact with the lower flange 23. The curved configuration of the contact tabs 36 and 42 facilitates movement of the electrode structures into position toward the center of the spool during winding. The curved resilient contact tabs 36 and 42 bear against the respective contact surfaces 29 and 28 providing good physical and electrical contact therewith and urging the respective insulating spacers 39 and 45 against the opposite contact surfaces.

The resulting wound structure includes alternating layers of the anode electrode structure 32 and the cathode current collector electrode structure 31 separated by porous insulating material 33. For an electrochemical system which is lithium limited both the first layer around the post and the outer layer of the electrode assembly are the cathode current collector electrode structure 31.

Two battery stacks 20 each including an electrode assembly wound on a spool 21 are placed within the case 10 of the housing. As illustrated in FIG. 1, the lower battery stack is positioned with the flange 22 which is its anode contact member lowermost, and the upper battery stack is positioned with the flange 22 which is its anode contact member uppermost. Insulating spacers 49 and 52 are employed to prevent the anode contact members 22 of the upper and lower battery stacks 20, respectively, from shorting to the case 10. These insulating spacers 49 and 52 may also serve to hold the battery stacks in position in the housing.

The anode contact members 22 of both battery stacks are electrically connected to each other by an appropriately insulated conductor 53 which passes through the hollow posts 25. An electrical connection 50 between the anode contact member 22 of the upper battery stack and the metal terminal 13 central of the cover provides an external connection for the anode electrode structures of the cell. The cathode current collector contact members 23 of the two battery stacks are in physical and electrical contact and are electrically connected to the conductive case 10 which provides an external terminal of the cell by conductors 54 and 55.

Prior to sealing, the cell is filled with a suitable electrolytic solution, specifically a solution containing a solvent of a reducible liquid cathode material. The post 25 of each spool 21 may contain openings to facilitate the passage of the solution throughout the interior of the cell.

For a specific embodiment of an electrochemical cell in accordance with the invention the flanges 22 and 23 may have a diameter of 1.10 inches and the post 25 a diameter of 0.25 inch. The height of the spool 21 is 1.10 inches. The substrates 35 and 41 of the electrode structures 31 and 32 are 0.002 inch thick nickel. The lithium anode material 46 on each side of the anode electrode substrate 41 is 0.005 to 0.010 inch thick, and the porous carbon catalyst material 40 on each side of the cathode current collector electrode substrate 35 is 0.010 to 0.020 inch thick. The insulating material 33 is porous sheets of glass fiber 0.005 to 0.010 inch thick.

Oxidizable materials other than lithium which may be employed in electrochemical cells as described include other alkali metals and also alkaline earth metals. The electrolytic solution comprises a solvent of a reducible liquid cathode material. Among the cathode materials found useful are fluid oxyhalides, fluid non-metallic oxides, fluid non-metallic halides, and mixtures thereof. An electrolyte solute is dissolved in the solvent in order to raise its conductivity. Specifically the solvent may be thionyl chloride and the solute lithium tetrachloroaluminate.

Figure 3:
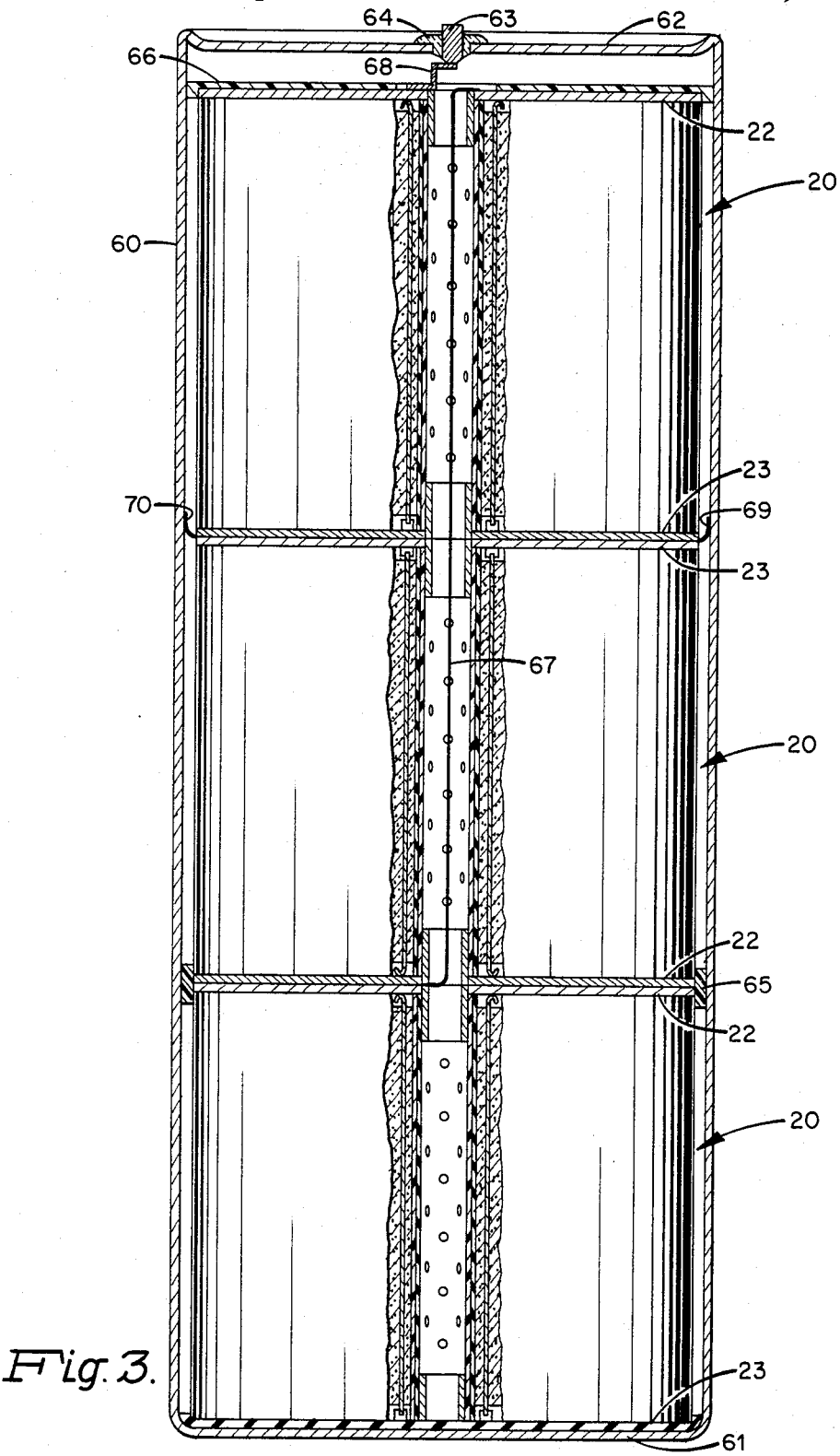
FIG. 3 is an elevational view partially in cross-section illustrating a modification of an electrical cell in accordance with the present invention.

FIG. 3 illustrates a modified electrochemical cell in accordance with the present invention employing three battery stacks 20 connected in parallel. The three battery stacks 20 which are shown in detail in FIG. 2 are part of the electrochemical system within a housing of a cylindrical metal case 60. The case has a bottom end wall 61 and the open upper end is sealed by a conductive cover 62 sealed thereto. A conductive terminal 63 is sealed centrally by the cover of a suitable insulating hermetic seal 64.

In the specific embodiment shown in FIG. 3, the flange 23 which is the cathode current collector contact member of the lowermost battery stack is in contact with the bottom wall 61 of the conductive case 60 and may be welded thereto. The middle battery stack is placed in the case 60 with the flange 22 which is its anode contact member in physical and electrical contact with the corresponding flange 22 of the lowermost battery stack. Both flanges 22 are spaced from the interior walls of the case 60 by an insulating ring 65. The uppermost battery stack is placed with its cathode current collector contact member 23 in physical and electrical contact with the cathode current collector contact member 23 of the middle battery stack. An insulator 66 prevents contact between the anode contact member 22 and the interior walls of the conductor case 60.

The anode contact members 22 of the middle and lowermost battery stacks are connected to the anode contact member 22 of the uppermost battery stack by an appropriately insulated conductor 67 passing through the central opening in the battery stacks. The anode contact member 22 of the uppermost battery stack is connected to the central terminal 63 by a conductor 68. The cathode current collector contact members 23 of the uppermost and middle battery stacks are electrically connected to the conductive case 60 by conductors 69 and 70. The cell is filled with an electrolytic solution containing a solvent of a reducible liquid cathode material.

Each battery stack of the electrochemical cell as described provides for uniform heat sinking along the entire length of each electrode structure by virtue of the contact tabs of the substrate which bear against the associated conductive flange being distributed along the length of the substrate. The battery stack as shown provides short, unform conductive paths for current flow. The use of more than one battery stack in a cell provides increased total electrode surface area and therefore increased cell capacity without lengthening the paths for current flow within the electrode assemblies. Thus losses due to internal resistance in the electrode structures are the same for each battery stack regardless of the number of battery stacks employed to supply the desired cell capacity.

While there has been shown and described what are considered preferred embodiments of the present invention, it will be obvious to those skilled in the art that various changes and modifications may be made therein without departing from the invention as defined by the appended claims.

What is claimed is:

1. An electrochemical cell comprising
   a housing;
   an electrochemical system within the housing including an electrolytic solution and first and second battery stacks exposed to the electrolytic solution;
   said first battery stack including
      a spool having first and second conductive contact members with a post therebetween supporting the contact members in fixed relationship and electrically insulated from each other,
      a first electrode structure,
      a second electrode structure,
      said first and second electrode structures being wound around said post and being electrically insulated from each other,
      said first electrode structure being in physical and electrical contact with said first conductive contact member and being electrically insulated from said second conductive contact member, and
      said second electrode structure being in physical and electrical contact with said second conductive contact member and being electrically insulated from said first conductive contact member;
   said second battery stack including
      a spool having first and second conductive contact members with a post therebetween supporting the contact members in fixed relationship and electrically insulated from each other,
      a first electrode structure,
      a second electrode structure,
      said first and second electrode structures being wound about said post and being electrically insulated from each other,
      said first electrode structure being in physical and electrical contact with said first conductive contact member and being electrically insulated from said second conductive contact member, and
      said second electrode structure being in physical and electrical contact with said second conductive contact member and being electrically insulated from said first conductive contact member.

2. An electrochemical cell in accordance with claim 1 including
   first terminal means connected to the first conductive contact members of the first and second battery stacks; and
   second terminal means connected to the second conductive contact member of the first and second battery stacks.

3. An electrochemical cell comprising
   a housing including an elongated hollow cylindrical metal case and a cover therefor;
   an electrochemical system within the housing including an electrolytic solution and first and second battery stacks exposed to the electrolytic solution;
   said first battery stack including
      a spool having first and second conductive contact members with a post therebetween supporting the contact members in fixed parallel relationship and electrically insulated from each other;
      an electrode assembly of an elongated first electrode structure, an elongated second electrode structure, and porous insulating material separating said first and second electrode structures;
      said first electrode structure including an elongated conductive substrate having resilient, deflective contact elements along the length thereof at one edge;
      said second electrode structure including an elongated conductive substrate having resilient, deflective contact elements along the length thereof at one edge;
      said electrode assembly being wound around said post with said first and second electrode structures forming alternate layers separated by porous insulating material;
      said resilient, deflective contact elements of said first electrode structure bearing against said first conductive contact member to provide physical and electrical contact therewith and said resilient, deflective contact elements of said second electrode structure bearing against said second conductive contact member to provide physical and electrical contact therewith;
   said second battery stack including
      a spool having first and second conductive contact members with a post therebetween supporting the contact members in fixed parallel relationship and electrically insulated from each other;
      an electrode assembly of an elongated first electrode structure, an elongated second electrode structure, and porous insulating material separating said first and second electrode structures;

said first electrode structure including an elongated conductive substrate having resilient, deflective contact elements along the length thereof at one edge;

said second electrode structure including an elongated conductive substrate having resilient, deflective contact elements along the length thereof at one edge;

said electrode assembly being wound around said post with said first and second electrode structures forming alternate layers separated by porous insulating material;

said resilient, deflective contact elements of said first electrode structure bearing against said first conductive contact member to provide physical and electrical contact therewith and said resilient, deflective contact elements of said second electrode structure bearing against said second conductive contact member to provide physical and electrical contact therewith.

4. An electrochemical cell in accordance with claim 3 including a metal electrical terminal extending through said cover and electrically insulated from said case;

said metal electrical terminal and the first conductive contact member of said spools of said first and second battery stacks being electrically connected together; and said second conductive members of said spools of said first and second battery stacks being electrically connected to said metal case.

5. An electrochemical cell in accordance with claim 4 wherein the resilient, deflective tabs of substrate material of the first electrode structure and the resilient, deflective tabs of substrate material of the second electrode structure of said first battery stack are each of curved configuration in a direction to facilitate movement of the electrode structures into position toward the center of the spool during winding of the electrode assembly around the post; and the resilient, deflective tabs of substrate material of the first electrode structure and the resilient, deflective tabs of substrate material of the second electrode structure of said second battery stack are each of curved configuration in a direction to facilitate movement of the electrode structures into position toward the center of the spool during winding of the electrode assembly around the post.

6. An electrochemical cell in accordance with claim 5 wherein said first electrode structures of said first and second battery stacks each include a first electrode material on both sides of the substrate; and said second electrode structures of said first and second battery stacks each include a second electrode material on both sides of the substrate.

7. An electrochemical cell in accordance with claim 4 wherein said contact elements of said substrate of said first electrode structure of each of said first and second battery stacks comprises a plurality of resilient, deflective tabs of substrate material spaced along said one edge thereof and extending beyond the first electrode material;

said contact elements of said substrate of said second electrode structure of each of said first and second battery stacks comprises a plurality of resilient, deflective tabs of substrate material spaced along said one edge thereof and extending beyond the second electrode material;

said resilient, deflective tabs of substrate material of each of said first electrode structures bearing against said first conductive contact member to make physical and electrical contact therewith; and said resilient, deflective tabs of substrate material of each of said second electrode structures bearing against said second conductive contact member to make physical and electrical contact therewith.

8. An electrochemical cell in accordance with claim 7 wherein the opposite edge along the length of said substrate of the first electrode structure of each of said first and second battery stacks is protected by insulating material positioned at said opposite edge to prevent electrical contact with said second conductive contact member;

said resilient, deflective tabs of substrate material of the first electrode structure of each of said first and second battery stacks bearing against said first conductive contact member urging said insulating material against said second conductive member; and the opposite edge along the length of said substrate of the second electrode structure of each of the first and second battery stacks is protected by insulating material positioned at said opposite edge to prevent electrical contact with said first conductive contact member;

said resilient, deflective tabs of substrate material of the second electrode structure of each of said first and second battery stacks bearing against said second conductive contact member urging said insulating material against said first conductive contact member.

9. An electrochemical cell in accordance with claim 6 wherein said electrolytic solution comprises a reducible liquid cathode material;

one of said electrode materials includes an oxidizable active anode material; and the other of said electrode materials includes a catalyst material for reducing the liquid cathode material.

10. An electrochemical cell in accordance with claim 9 wherein the oxidizable active anode material is selected from the group consisting of alkali metals and alkaline earth metals.

11. An electrochemical cell in accordance with claim 10 wherein the reducible liquid cathode material is selected from the group consisting of fluid oxyhalides, fluid non-metallic oxides, fluid non-metallic halides, and mixtures thereof.

12. An electrochemical cell in accordance with claim 11 wherein the oxidizable active anode material comprises lithium metal; and the reducible liquid cathode material comprises thionyl chloride.

* * * * *